United States Patent [19]

Dickinson et al.

[11] Patent Number: 4,643,937

[45] Date of Patent: Feb. 17, 1987

[54] LAMINATE FORMED FROM A POLYARYLATE SHEET AND A POLYCARBONATE AND/OR POLYESTER SHEET

[75] Inventors: Barry L. Dickinson; Lloyd M. Robeson, both of Whitehouse Station; Marvin E. Sauers, Belle Mead, all of N.J.

[73] Assignee: Union Carbide Corporation, Danbury, Conn.

[21] Appl. No.: 706,289

[22] Filed: Feb. 27, 1985

[51] Int. Cl.$^4$ .................. B32B 5/16; B32B 27/36; C08G 63/22

[52] U.S. Cl. .................. 428/215; 428/412; 428/480; 528/176; 528/190; 528/193; 264/176

[58] Field of Search .............. 428/412, 333, 332, 480, 428/215; 528/176

[56] References Cited

U.S. PATENT DOCUMENTS

| | | | |
|---|---|---|---|
| 3,444,129 | 5/1969 | Young, Jr. et al. | 528/176 |
| 3,460,961 | 8/1969 | Young, Jr. et al. | 428/480 |
| 4,415,721 | 11/1983 | Kosanovich et al. | 528/176 |
| 4,425,403 | 1/1984 | Taniguchi et al. | 428/412 |

*Primary Examiner*—P. C. Ives
*Attorney, Agent, or Firm*—Donald M. Papuga

[57] ABSTRACT

Described herein are laminates formed from a layer of a polyarylate sheet and a layer of an aromatic polycarbonate, a polyester, or mixtures of these resin sheets. These laminates are suitable for use in glazing applications.

25 Claims, No Drawings

LAMINATE FORMED FROM A POLYARYLATE SHEET AND A POLYCARBONATE AND/OR POLYESTER SHEET

TECHNICAL FIELD

This invention is directed to a laminate formed from a layer of a polyarylate sheet and a layer of a sheet of an aromatic polycarbonate, a thermoplastic polyester, or blends of these polymers.

BACKGROUND OF THE INVENTION

Aromatic polycarbonates, especially those formed from bisphenol-A and carbonyl chloride, and polyesters, such as poly(ethylene terephthalate), are extensively used in glazing applications. That is, sheets made from these resins are used as windows, films, sky-lights, etc. However, in long-term exposure to ultraviolet (UV) light, the sheets become hazy. The haze is a micro cracking of the surface. This crazing results in a loss of mechanical properties and light transmission. A solution to this problem has been to apply coatings to the sheets. The coating is helpful to some extent since it is able to protect the sheet against haze for a longer period of time than an uncoated sheet. However, crazing is still a problem. Also, coating is expensive since special equipment is needed, and contained in the casting polymer are relatively large quantities of expensive UV absorbers. Further, solvent contained in the coating must be evaporated.

Polyarylates are polyesters derived from a dihydric phenol, particularly bisphenol-A and an aromatic dicarboxylic acid, particularly mixtures of terephthalic and isophthalic acids. The polyarylates are high temperature, high performance thermoplastic polymers with a good combination of mechanical properties and are used to mold a variety of articles.

It is known that upon exposure to ultraviolet light polyarylates undergo the Photo-Fries rearrangement. Korshak et al in Synthesis and Properties of Self-Protecting Polyarylates, Journal of Polymer Science, Part A-1, Vol. 7, pages 157 to 172 (1969) describe a mechanism to explain what happens when polyarylates are exposed to UV light. The authors propose that polyarylates undergo the Photo-Fries rearrangement resulting in carbonyl and hydroxyl groups ortho to one another, structurally similar to o-hydroxybenzophenones which are known light absorbers. Thus, the polyarylates have increased photostability in the bulk of the material.

Cohen et al in Transparent Ultraviolet-Barrier Coatings, Journal of Polymer Science, Part A-1, Vol. 9, pages 3263 to 3299 (1971) describe a number of phenyl polyesters, including polyarylates, which were synthesized to furnish molecules whose backbones rearrange under UV light to an o-hydroxybenzophenone structure. This Photo-Fries rearrangement produced ultraviolet opacity in an irradiated film while maintaining visual transparency. Thin coatings of these polyesters completely protected substrates ordinarily sensitive to ultraviolet light. The authors state that spectroscopic analysis of various rearranged films and coatings showed that the o-hydroxybenzophenone polymer formed was concentrated at the irradiated surface of the original polyester coating as a "skin". Such a skin, formed in situ during the irradiation, functioned to protect both the original polyester coating as well as the coated substrate from degradation by ultraviolet irradiation. Furthermore, a significant "healing" mechanism appeared inherent in the coatings, for as the exposed skin ultimately degraded under extended ultraviolet irradiation, more of the underlying polyester layer apparently rearranged to compensate for the loss. Thus, the clear coating functioned both as a protective skin and a rearrangeable reservoir.

U.S. Pat. No. 3,492,261 describes film forming solutions of rearrangeable aromatic polyesters which are the polymeric reaction product of an aromatic dihydric compound and an aromatic dicarboxylic compound. It is stated in this patent that the preferred dihydric compounds are the ester derivatives of 4,4-bis(4'-hydroxyphenyl)pentanoic acid. The solutions of aromatic polyesters can be coated onto a substrate and dried to transparent films, are capable of absorbing ultraviolet light and undergo rearrangement in the presence thereof to form a transparent compound which is stable to and will act as a barrier to ultraviolet light.

U.S. Pat. No. 3,503,779 discloses substrates which are coated with rearrangeable aromatic polyesters which are the polymeric reaction product of an aromatic dihydric compound and an aromatic dicarboxyl compound. The outer exposed surface of the aromatic polyester coatings rearrange under the influence of ultraviolet light to form a new transparent compound which is stable to and will act as a barrier to ultraviolet light.

U.S. Pat. No. 3,444,129 discloses rearrangeable aromatic polyesters which are the polymeric reaction product of an aromatic dihydric compound, and an aromatic dicarboxylic compound. The preferred dihydric compound is stated to be the ester derivatives of 4,4-bis(4'-hydroxyphenyl) pentanoic acid. The rearrangeable aromatic polyesters are useful as ultraviolet light barriers.

U.S. Pat. No. 3,460,961 describes substrates which are protected with a transparent aromatic polyester coating of two contiguous superposed layers. The aromatic polyester compounds are the reaction product of an aromatic dihydric compound and an aromatic dicarboxylic compound. The aromatic polyester coating undergoes rearrangement in the presence of ultraviolet light to form a transparent compound which is stable to and acts as a barrier to ultraviolet light.

However, in all of these references coatings are being utilized which, as discussed above, require expensive solvent coating equipment and require evaporation of a solvent.

U.S. patent application Ser. No. 596,075 filed Apr. 4, 1984 in the names of L. M. Robeson et al, titled "Laminate Compositions With Polyarylate and Poly Aryl Ether", commonly assigned, describes laminate compositions comprising a polyarylate, or blends thereof, derived from a dihydric phenol and an aromatic dicarboxylic acid which is laminated upon the surface of a poly(aryl ether), particularly polysulfone. It is stated therein that excellent protection is afforded the polysulfone against degradation resulting from prolonged UV exposure by laminating the polyarylate upon its surface.

THE INVENTION

In the present invention it has been found that a sheet made from an aromatic polycarbonate or a thermoplastic polyester, or combinations of these polymers can be protected from ultraviolet light by laminating thereon a sheet made from a polymer which undergoes a Photo-Fries rearrangement, such as a polyarylate, onto one or both of its surfaces. As compared to the prior art methods which utilize a coating to protect a substrate against UV light, the present invention does not have the disadvantages of solvent removal. Also, this invention provides permanent protection to the underlying surface as compared to a coating which can wear off.

The combination of polyarylate laminated onto polycarbonate or polyester is unique since excellent adhesion is observed and scrap can be reused without affecting the transparency of the laminated product. This allows for a unique and important characteristic (reuse of scrap) which is the essence of this invention.

Specifically, the present invention comprises a laminate formed from a layer of a polyarylate sheet and a layer of an aromatic polycarbonate, a thermoplastic polyester, or blends of the polycarbonate and polyester sheet. A preferred laminate comprises a layer of a polyarylate derived from bisphenol-A and isophthalic and/or terephthalic acid sheet and a layer of a polycarbonate derived from bisphenol-A and phosgene and/or a polyester such as poly(ethylene terephthalate) sheet. The polyarylate sheet may be laminated to one or both sides of the polycarbonate and/or polyester sheet.

The laminates of this invention can be from about 30 mils to about ½ inch thick, preferably from about 40 to about 90 mils thick. The sheets which form the laminates are from about 1 mil to about 100 mils, preferably from about 2 to about 10 mils thick for the polyarylate and from about 2 mils to ½ inch, preferably from about 50 to about 80 mils thick for the polycarbonate and/or polyester.

Polyarylates

The polyarylates which are suitable for use in this invention are derived from a dihydric phenol and at least one aromatic dicarboxylic acid and have a reduced viscosity of from about 0.4 to greater than about 1.0, preferably from about 0.6 to about 0.8 dl/gm, as measured in chloroform (0.5 g/100 ml chloroform) or other suitable solvent at 25° C.

A particularly desirable dihydric phenol is of the following formula:

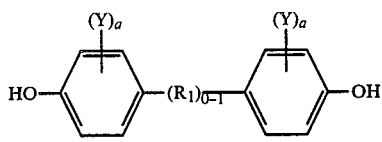

wherein Y is independently selected from, hydrogen, alkyl groups of 1 to 4 carbon atoms, chlorine or bromine, each a, independently, has a value of from 0 to 4, inclusive, and $R_1$ is a divalent saturated or unsaturated aliphatic hydrocarbon radical, particularly an alkylene or alkylidene radical having from 1 to 6 carbon atoms, or a cycloalkylidene or cycloalkylene radicals having up to and including 9 carbon atoms, O, CO, $SO_2$, or S. The dihydric phenols may be used individually or in combination.

The dihydric phenols that may be used in this invention include the following:

2,2-bis-4(4-hydroxyphenyl)propane;
bis-(2-hydroxyphenyl)methane,
bis-(4-hydroxyphenyl)methane,
bis-(4-hydroxy-2,6-dimethyl-3-methoxyphenyl) methane,
1,1-bis-(4-hydroxyphenyl)ethane,
1,2-bis-(4-hydroxyphenyl)ethane,
1,1-bis-(4-hydroxy-2-chlorophenyl)ethane,
1,3-bis-(3-methyl-4-hydroxyphenyl)ethane,
1,3-bis-(3-methyl-4-hydroxyphenyl)propane,
2,2-bis-(3-phenyl-4-hydroxyphenyl)propane,
2,2-bis-(3-isopropyl-4-hydroxyphenyl) propane,
2,2-bis-(2-isopropyl-4-hydroxyphenyl) propane,
2,2-bis-(4-hydroxyphenyl)pentane,
3,3-bis-(4-hydroxyphenyl)pentane,
2,2-bis-(4-hydroxyphenyl)heptane,
1,2-bis-(4-hydroxyphenyl)1,2-bis-(phenyl)propane,
4,4'-(dihydroxyphenyl)ether,
4,4'-(dihydroxyphenyl)sulfide,
4,4'-(dihydroxyphenyl)sulfone,
4,4'-(dihydroxyphenyl)sulfoxide,
4,4'-(dihydroxybenzophenone), and
naphthalene diols The aromatic dicarboxylic acids that may be used in this invention include terephthalic acid, isophthalic acid, any of the naphthalene dicarboxylic acids and mixtures thereof, as well as alkyl substituted homologs of these carboxylic acids, wherein the alkyl group contains from 1 to about 4 carbon atoms, and acids containing other inert substituents, such as halides, alkyl or aryl ethers, and the like. Acetoxybenzoic acid can also be used. Preferably, mixtures of isophthalic and terephthalic acids are used. The isophthalic acid to terephthalic acid ratio in the mixture is about 0:100 to about 100:0, while the most preferred acid ratio is about 75:25 to about 50:50. Also, from about 0.5 to about 20 percent of aliphatic diacids containing from 2 to about 10 carbon atoms, such as adipic acid, sebacic acid, and the like may be additionally used in the polymerization reaction.

The polyarylates of the present invention can be prepared by any of the well known prior art polyester forming reactions, such as the reaction of the acid chlorides of the aromatic dicarboxylic acids with the dihydric phenols; the reaction of the diaryl esters of the aromatic dicarboxylic acids with the dihydric phenols; or the reaction of the aromatic diacids with diester derivatives of the dihydric phenol. These processes are described in, for example, U.S. Pat. Nos. 3,317,464; 3,948,856; 3,780,148; 3,824,213; and 3,133,898.

The polyarylates are preferably prepared by the process as set forth in U.S. Pat. No. 4,321,355. This process comprises the following steps:

(a) reacting an acid anhydride derived from an acid containing from 2 to 8 carbon atoms with at least one dihydric phenol to form the corresponding diester; and (b) reacting said diester with at least one aromatic dicarboxylic acid at a temperature sufficient to form the polyarylate, wherein the improvement comprises removing residual acid anhydride after formation of the dihydric phenol diester so that its concentration is less than about 1500 parts per million.

The acid anhydride suitable is derived from an acid containing from 2 to 8 carbon atoms. The preferred acid anhydride is acetic anhydride.

The dihydric phenol is described above.

Generally, the dihydric phenol reacts with the acid anhydride under conventional esterification conditions to form the dihydric phenol diester. The reaction may take place in the presence or absence of a solvent. Additionally, the reaction may be conducted in the presence of a conventional esterification catalyst or in the absence thereof.

Aromatic Polycarbonate

The thermoplastic aromatic polycarbonates that can be employed herein are homopolymers and copolymers and mixtures thereof, which have an intrinsic viscosity of from about 0.4 to about 1.0 dl./g. as measured in methylene chloride at 25° C. The polycarbonates are prepared by reacting a dihydric phenol with a carbonate precursor. Typical of some of the dihydric phenols that may be employed are bisphenol-A, bis(4-hydroxyphenyl)methane, 2,2-bis(4-hydroxy-3-methylphenyl)propane, 4,4-bis(4-hydroxyphenyl)heptane, 2-2-(3,5,3',5'tetrabromo-4,4'dihydroxydiphenyl)propane, (3,3'dichloro-4,4'dihydroxydiphenyl)methane, and the like. Other dihydric phenols of the bisphenol type are described in, for example, U.S. Pat. Nos. 2,999,835, 3,028,365 and 3,334,154.

It is, of course, possible to employ two or more different dihydric phenols or a copolymer of a dihydric phenol with a glycol or with hydroxy or acid terminated polyesters.

The carbonate precursor may be either a carbonyl halide, a carbonate ester, or a haloformate. The carbonyl halides which can be employed herein are carbonyl bromide, carbonyl chloride and mixtures thereof. Typical of the carbonate esters which may be employed herein are diphenyl carbonate, di-(halophenyl)carbonates, such as di-(chlorophenyl)carbonate or di-(bromophenyl)carbonate, etc., di-(alkylphenyl)carbonates such as di(tolyl)carbonate, di(naphthyl)carbonate, di(-chloronaphthyl)carbonate, etc. or mixtures thereof. The haloformates suitable for use herein include bishaloformate of dihydric phenols for example, bischloroformates of bisphenol-A, of hydroquinone, etc. or glycols for example, bishaloformates of ethylene glycol, neopentyl glycol, polyethylene glycol, etc. While other carbonate precursors will be apparent to those skilled in the art, carbonyl chloride, also known as phosgene, is preferred.

The aromatic polycarbonate polymers may be prepared by methods well known in the art by using phosgene or a haloformate and by employing a molecular weight regulator, an acid acceptor and a catalyst. The molecular weight regulators which can be employed in carrying out the process include monohydric phenols, such as phenol, para-tertiary-butylphenol, para-bromophenol, primary and secondary amines, etc. Preferably, a phenol is employed as the molecular weight regulator.

A suitable acid acceptor may be either an organic or an inorganic acid acceptor. A suitable organic acid acceptor is a tertiary amine and includes materials, such as pyridine, triethylamine, dimethylaniline, tributylamine, etc. The inorganic acid acceptor may be one which can be either a hydroxide, a carbonate, a bicarbonate, or a phosphate of an alkali or alkaline earth metal.

The catalysts which are employed herein can be any of the suitable catalysts that aid the polymerization of, for example, bisphenol-A with phosgene. Suitable catalysts include tertiary amines, such as triethylamine, tripropylamine, N,N-dimethylaniline, quaternary ammonium compounds, such as tetraethylammonium bromide, cetyl triethyl ammonium bromide, tetra-n-heptylammonium iodide, and quaternary phosphonium compounds, such as n-butyltriphenyl-phosphonium bromide and methyl-triphenyl phosphonium bromide.

The polycarbonates can be prepared in a one-phase (homogeneous solution) or a two-phase (interfacial) systems when phosgene, or a haloformate are used. Bulk reactions are possible when the diarylcarbonate precursors are used.

Also, aromatic polyester carbonates may be used. These are described in, for example, U.S. Pat. No. 3,169,121. The preferred polyester carbonate results from the condensation of phosgene, terephthaloyl chloride, isophthaloyl chloride with bisphenol-A and a small amount of p-tertbutylphenol.

Polyesters

The polyesters which are suitable for use herein are derived from an aliphatic or cyloaliphatic diol, or mixtures thereof, containing from 2 to about 10 carbon atoms and at least one aromatic dicarboxylic acid. The polyesters which are derived from an aliphatic diol and an aromatic dicarboxylic acid have repeating units of the following general formula:

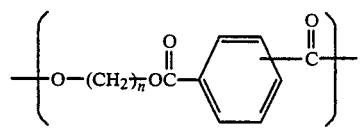

wherein n is an integer of from 2 to 10.

The preferred polyester is poly(ethylene terephthalate).

Also contemplated herein are the above polyesters with minor amounts, e.g., from 0.5 to about 2 percent by weight, of units derived from aliphatic acids and/or aliphatic polyols, to form copolyesters. The aliphatic polyols include glycols, such as poly(ethylene glycol). These can be made following the teachings of, for example, U.S. Pat. Nos. 2,465,319 and 3,047,539.

The polyesters which are derived from a cycloaliphatic diol and an aromatic dicarboxylic acid are prepared by condensing either the cis- or trans-isomer (or mixtures thereof) of, for example, 1,4-cyclohexanedimethanol with an aromatic dicarboxylic acid so as to produce a polyester having recurring units of the following formula:

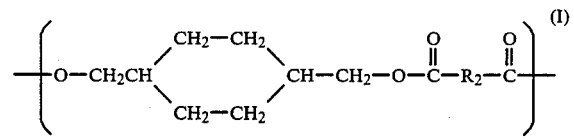

wherein the cyclohexane ring is selected from the cis- and trans-isomers thereof and $R_2$ represents an aryl radical containing 6 to 20 carbon atoms and which is the decarboxylated residue derived from an aromatic dicarboxylic acid.

Examples of aromatic dicarboxylic acids indicated by $R_2$ in formula I, are isophthalic or terephthalic acid, 1,2-di(p-carboxyphenyl)ethane, 4,4'-dicarboxydiphenyl ether, etc., and mixtures of these. All of these acids contain at least one aromatic nucleus. Fused rings can also be present, such as in 1,4- or 1,5-naphthalenedicarboxylic acids. The preferred dicarboxylic acids are terephthalic acid or a mixture of terephthalic and isophthalic acids.

A preferred polyester may be derived from the reaction of either the cis- or trans-isomer (or a mixture thereof) of 1,4-cyclohexanedimethanol with a mixture of isophthalic and terephthalic acids. These polyesters have repeating units of the formula:

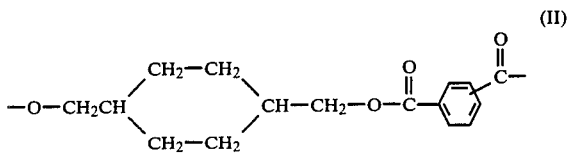

(II)

Another preferred polyester is a copolyester derived from a cyclohexane dimethanol, an alkylene glycol and an aromatic dicarboxylic acid. These copolyesters are prepared by condensing either the cis- or trans-isomer (or mixtures thereof) of, for example, 1,4-cyclohexanedimethanol and an alkylene glycol with an aromatic dicarboxylic acid so as to produce a copolyester having repeating units of the following formula:

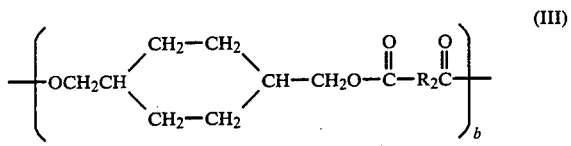

(III)

wherein the cyclohexane ring is selected from the cis- and trans-isomers thereof, $R_2$ is as previously defined, n is an integer of 2 to 10, the b units comprise from about 10 to about 90 percent by weight and the c units comprise from about 10 to about 90 percent by weight.

The preferred copolyester may be derived from the reaction of either the cis- or trans-isomer (or mixtures thereof) of 1,4-cyclohexanedimethanol and ethylene glycol with terephthalic acid in a molar ratio of 1:2:3. These copolyesters have repeating units of the following formula:

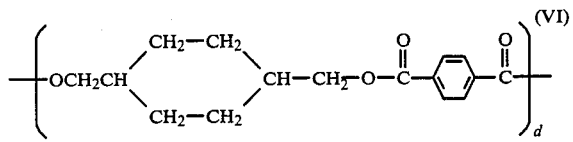

(VI)

wherein d can be 10 to 10,000. Block as well as random copolymers are possible.

The polyester as described herein are either commercially available or can be produced by methods well known in the art, such as those set forth in, for example, U.S. Pat. No. 2,901,466.

The polyesters used herein have an intrinsic viscosity of from about 0.4 to about 2.0 dl/g. as measured in a 60:40 phenol/tetrachloroethane mixture or similar solvent at 23° to 30° C.

The polyarylate may be blended with other polymers including polycarbonates and/or polyesters. The polycarbonate and/or polyester may be blended with each other or with other polymers such as a polyarylate. Other additives may be used with the polymers such as stabilizers, flame retardants, and the like. Since the primary use of the laminate is for glazing applications which are transparent, only those additives are generally used which maintain the transparency of the laminate. However, if an application is desired where transparency is not needed, such as certain types of solar collectors, than any desired additive may be used.

The thermoplastic polymer, and one or more optional additives are generally compounded in an extruder. The compounding is carried out at temperature of from about 200° C. to about 400° C. The compounded material may be pelletized by conventional techniques. The compounded material is extruded into a sheet and then formed into a laminate.

Alternatively, the thermoplastic polymer either alone or in combination with other materials may be fed in particulate form (such as pellets, granules, particles, powders, and the like) into an extruder which extrudes the material into a laminate. The extruders which are used to form the laminate are well known in the art. Typically, the extruder may be a 2½ inch Davis Standard extruder containing an extruder screw with a length to diameter ratio of 24 to 1.

The laminate may be prepared by the procedure and using the apparatus as described in U.S. Pat. No. 3,557,265. In the method of said patent, film or sheet having a plurality of layers is formed by deforming a flowing stream having layers of diverse thermoplastic material wherein the cross-sectional configuration of the plurality of flowing streams is altered by reducing the dimension of the stream in a direction generally perpendicular to the interfaces between the individual streams and by increasing the dimension of the stream in a direction generally parallel to the interface to provide a sheet having a laminar structure.

In another method two or more previously extruded sheets are brought together under pressure and temperature conditions or in the presence of adhesives in order to obtain adherence of the sheets to one another.

Coextrusion offers the least expensive means of preparing the laminate. Within coextrusion, three different techniques are most often employed. In one of these techniques, two or more sheets are extruded from separate extruders through separate sheet dies into contact with one another while still hot and then passed through a single set of rollers or another extrusion die and down a single sheet line. Another coextrusion technique employs an adaptor or other means of bringing two or more different plastic materials from two or more extruders into contact with one another prior to their passage through an extrusion die. A further coextrusion technique is where two or more polymer melts meet in an extrusion die to form a laminate. Coextrusion is the preferred technique for forming the laminates of this invention.

The laminate may be formed into a shaped article such as a lens, a globe, and the like. If the laminate is to be used as a window, the laminate may be coated with a mar resistant coating.

EXAMPLES

The following examples serve to give specific illustrations of the practice of this invention but they are not intended in any way to limit the scope of this invention.

The following designations used in the Examples have the following meaning:

Polyarylate I: A polymer having repeat units of the formula:

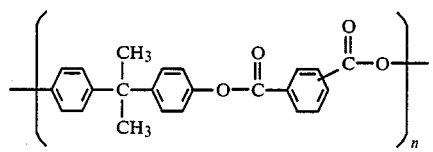

having a reduced viscosity of 0.66 as measured in p-chlorophenol, 0.2 g/100 ml at 49° C. (ARDEL® D-100 obtained from Union Carbide Corp.)

Polyarylate II: A blend of 60 weight percent of Polyarylate I and 40 weight percent of a poly(ethylene terephthalate) having an intrinsic viscosity of 0.64 as measured in 60:40 phenol/tetrachloroethane at 23° C.

Polycarbonate I: An aromatic bisphenol-A polycarbonate having a reduced viscosity of 0.64 dl/g as measured in chloroform at 25° C. (Lexan 101 sold by General Electric Co.)

Polycarbonate II: An aromatic bisphenol-A polycarbonate (Lexan 143 sold by General Electric Co.)

Polycarbonate III: An aromatic bisphenol-A polycarbonate (Lexan 153 sold by General Electric Co.)

The samples were tested according to the following procedures:

| Test | ASTM Designation |
|---|---|
| Specular Gloss | D-2457 |
| Light Transmission | D-1003-61 |
| Haze | D-1003-61 |
| Color Factor | |
| Yellowness Index | D-1925-70 |
| Dominant Wavelength | |
| Purity | D-791 |

A brief description of these tests is the following:

Specular Gloss

Specular gloss values are used to compare the shiny appearance of surfaces and generally are related to surface smoothness. The specific definition is the relative luminous fractional reflectance of a specimen at the specular direction (where the relative luminous fractional reflectance is the ratio of the luminous flux reflected from, to that incident on, a specimen for specified solid angles).

Light Transmission

Light transmission is defined as the ratio of the transmitted to the incident light.

Haze

The haze of a material is defined as that percentage of transmitted light which when passing through the specimen deviates from the incident beam by forward scattering (deviation > 2.5 degrees).

Color Factor

Color factor is defined as the purity of color, in percent, divided by the thickness, in inches, of the test specimen.

Yellowness Index

Yellowness is defined as the deviation in chroma from whiteness in the dominant wavelength range from 570 to 580 m.

Dominant Wavelength

The dominant wavelength of a color is the wavelength of the spectrum color that when additively mixed in suitable proportions with a specified achromatic color, yields a match with the color desired.

Accelerated weathering of the test specimens was conducted in the following exposure units:

| ASTM Test Method | Name |
|---|---|
| G-23 | Fade-Ometer |
| | XW-weathering (carbon arc) |
| | Xenon |

Controls A to E

Polyarylates I and II and Polycarbonates I to III were compression molded into test specimens ⅛×4×4 inches. The samples were exposed for 8000 hours in the XW-weatherometer (Table I), a Fadeometer (Table II) and a Xenon Lamp (Table III).

The results are shown in Tables I to III.

TABLE I

| | XW-WEATHEROMETER EXPOSURE RESULTS | | | | | | | | | |
|---|---|---|---|---|---|---|---|---|---|---|
| | Polyarylate I 8,000 hours | | Polyarylate II 8,000 hours | | Polycarbonate I 8,000 hours | | Polycarbonate II 8,000 hours | | Polycarbonate III 8,000 hours | |
| Test | Initial | exposure | Initial | exposure | Initial | exposure | Initial | exposure | Initial | exposure |
| Gloss | 54.1 | 100.5 | 83.5 | 83.7 | 135 | 36.8 | 142 | 44.1 | 137 | 49.7 |
| Light Trans. (%) | 68.8 | 64.2 | 73.4 | 76.3 | 82.9 | 70.0 | 84.6 | 77.5 | 80.5 | 75.4 |
| Haze (%)[1] | 34.0 | 19.9 | 31.4 | 28.5 | 11.1 | 94.8 | 7.7 | 84.3 | 10 | 83.3 |
| Color Factor | 278 | 325 | 140 | 183 | 10 | 119 | 5 | 85 | 0 | 98 |
| Yellowness Index | 48.5 | 56.2 | 28.7 | 51.5 | 2.8 | 25.3 | 1.4 | 20 | 0.1 | 25 |
| Dominant Wavelength | 574 | 575 | 576 | 572 | 576 | 574 | 573 | 574 | 580 | 574 |
| Purity | 34.8 | 40 | 17.9 | 23.3 | 1.2 | 16 | 0.6 | 11.3 | 0.0 | 13.2 |

[1] High initial haze values due to sample preparation

TABLE II

| | FADEOMETER EXPOSURE RESULTS | | | | | | | | | |
|---|---|---|---|---|---|---|---|---|---|---|
| | Polyarylate I 8,000 hours | | Polyarylate II 8,000 hours | | Polycarbonate I 8,000 hours | | Polycarbonate II 8,000 hours | | Polycarbonate III 8,000 hours | |
| Test | Initial | exposure | Initial | exposure | Initial | exposure | Initial | exposure | Initial | exposure |
| Gloss | 60.7 | 82.3 | 104 | 73.8 | 135.1 | 55.5 | 124.8 | 67.2 | 139 | 61.4 |
| Light Trans. (%) | 70.3 | 59.3 | 74.2 | 71.6 | 82.9 | 59.3 | 84.3 | 73.9 | 82.7 | 70.1 |
| Haze (%)[1] | 32.6 | 68.9 | 17.2 | 48.8 | 11.1 | 95.6 | 9.8 | 94.1 | 6.9 | 93.0 |
| Color Factor | 289 | 361 | 141 | 232 | 10 | 170 | 1 | 76 | 1 | 104 |
| Yellowness Index | 50.8 | 55.3 | 28.8 | 54.5 | 2.8 | 22.7 | 0.9 | 18.5 | 0.3 | 23.1 |
| Dominant Wavelength | 574 | 575 | 576 | 572 | 576 | 575 | 568 | 574 | 600 | 574 |

TABLE II-continued

| | FADEOMETER EXPOSURE RESULTS | | | | | | | | | |
|---|---|---|---|---|---|---|---|---|---|---|
| | Polyarylate I 8,000 hours | | Polyarylate II 8,000 hours | | Polycarbonate I 8,000 hours | | Polycarbonate II 8,000 hours | | Polycarbonate III 8,000 hours | |
| Test | Initial | exposure | Initial | exposure | Initial | exposure | Initial | exposure | Initial | exposure |
| Purity | 35.6 | 45.1 | 17.9 | 29.7 | 1.2 | 23 | 0.1 | 10 | 0.1 | 14 |

[1]High initial haze values due to sample preparation technique

TABLE III

| | XENON LAMP EXPOSURE RESULTS | | | | | | | | | |
|---|---|---|---|---|---|---|---|---|---|---|
| | Polyarylate I 8,000 hours | | Polyarylate II 8,000 hours | | Polycarbonate I 8,000 hours | | Polycarbonate II 8,000 hours | | Polycarbonate III 8,000 hours | |
| Test | Initial | exposure | Initial | exposure | Initial | exposure | Initial | exposure | Initial | exposure |
| Gloss | 75.8 | 104.9 | 108.1 | 52.1 | 142 | 3 | 152 | 3.9 | 135 | 3.5 |
| Light Trans. (%) | 79.5 | 79.8 | 82.2 | 82.0 | 87.3 | 77.1 | 87.9 | 81.7 | 86.8 | 80.4 |
| Haze (%)[1] | 30.6 | 20.2 | 24 | 31.9 | 7.0 | + | 6.5 | + | 7.9 | + |
| Color Factor | 226 | 953 | 111 | 697 | 2 | 855 | 11 | 903 | 9 | 742 |
| Yellowness Index | 19 | 47.5 | 9.2 | 36.5 | 0.9 | 22.5 | 1.8 | 23 | 0.7 | 23.5 |
| Dominant Wavelength | 573 | 573 | 572 | 571 | 572 | 577 | 563 | 576 | 576 | 576 |
| Purity | 8.8 | 37.2 | 4.2 | 26.5 | 0.1 | 37.6 | 0.4 | 34.3 | 3.1 | 33.4 |

% Sample thickness: 25 to 40 mil
+ Data not reported by physical testing presumably due to very high values
[1]High initial haze values due to sample preparation technique The data in Tables I to III shows that the polyarylate samples exhibit less change in the three accelerated weathering tests than the polycarbonate samples. Of the three accelerated weathering tests, the Fadeometer yields the closest result between polycarbonate and polyarylate. Polyarylate still exhibits advantages in higher gloss, lower haze, and lower light transmission changes versus the polycarbonate samples. With exposure to the XW-Weatherometer, the polyacrylate samples also exhibit much better retention of gloss, much lower haze, and better retention of light transmission (versus initial values). The polyarylate samples exhibit a slightly lower change in color factor and yellowness index than all the polycarbonate samples.

Polyarylate II exhibits better overall characteristics than the stabilized polycarbonate products (Lexan 143, Lexan 153).

The sudden increase in haze for both Lexan 101 and Lexan 153 demonstrates a serious deficiency of polycarbonate (even the UV stabilized version, Lexan 153) for exterior transparent applications. The increase in haze is accompanied by a methodical decrease in light transmission and impact strength. The haze is micro cracking of the surface and this reduces the impact resistance of the sheet. It also results in loss of gloss imparting a dull appearance to the surface.

Polyarylate I and Polycarbonate III (UV plus heat stabilized polycarbonate) were injection molded into ASTM test parts on a 3 oz. molding machine. Included were tensile bars (⅛ in.), flex bars (⅛ in. and ¼ in. thick) and plaques (⅛ in.).

All samples were exposed in an XW-Weatherometer in accordance with ASTM-G-23 (XW carbon arc, 18 min. water spray every two hours) for up to 8,000 hours total exposure.

The samples were tested for tensile modulus according to ASTM D-638 yield strength and yield elongation according to ASTM D-638 and break elongation according to ASTM D-638.

TABLE IV

| | EFFECT OF XW-WEATHEROMETER ON TENSILE PROPERTIES | | | | |
|---|---|---|---|---|---|
| Sample | Time (hr) | Tensile Modulus (k psi) | Yield Strength (psi) | Yield Elongation (%) | Break Elongation (%) |
| Polyarylate I | 0 | 269 | 9,710 | 9.1 | 58.5 |
| | 1,000 | 315 | 9,730 | 8.5 | 27.5 |
| | 2,000 | 276 | 9,830 | 9.2 | 36.0 |
| | 4,000 | 310 | 9,870 | 9.6 | 22.5 |
| | 8,000 | 324 | 9,870 | 8.4 | 16.5 |
| Polycarbonate III | 0 | 306 | 8,940 | 6.4 | 121.0 |
| | 1,000 | 358 | 8,920 | 5.6 | 81.0 |
| | 2,000 | 311 | 9,160 | 6.2 | 92.0 |
| | 4,000 | 357 | 9,140 | 5.5 | 84.5 |
| | 8,000 | 366 | 9,310 | 5.3 | 83.0 |

Table V shows the effect of exposure of Polyarylate I and Polycarbonate III on tensile impact, (measured according to ASTM D-1822) notched Izod impact (measured according to ASTM D-256), and heat distortion temperature (measured according to ASTM D-635).

Comparing tensile impact values, the polyarylate was as tough as the polycarbonate after 8,000 hours exposure. Loss of toughness as a percent of unexposed toughness was much less for the polyarylate since the polycarbonate has a much higher starting value. In notched Izod toughness, the polycarbonate lost over 90 percent of its original value after only 2,000 hours exposure while the polyarylate showed only slight loss in Izod impact after 8,000 hours.

TABLE V

| EFFECT OF XW-WEATHEROMETER ON IMPACT AND HEAT DEFLECTION TEMPERATURE | | | | |
|---|---|---|---|---|
| Sample | Time (hrs) | Tensile Impact (ft-lb/in²) | Notched Izod (ft-lb/in²) | HDT (°C.) |
| Polyarylate I | 0 | 119 | 3.8 | 174 |
| | 1,000 | — | 3.7 | 165 |
| | 2,000 | 68 | 3.5 | 168 |
| | 4,000 | 77 | 3.0 | 166 |
| | 8,000 | 71 | 2.5 | 160 |
| Polycarbonate III | 0 | 275 | 18 | 133 |
| | 1,000 | — | 7.5 | 134 |
| | 2,000 | 84 | 1.7 | 135 |
| | 4,000 | 105 | 1.7 | 133 |

| TABLE V-continued |
| --- |

| EFFECT OF XW-WEATHEROMETER ON IMPACT AND HEAT DEFLECTION TEMPERATURE | | | | |
| --- | --- | --- | --- | --- |
| Sample | Time (hrs) | Tensile Impact (ft-lb/in$^2$) | Notched Izod (ft-lb/in$^2$) | HDT (°C.) |
| | 8,000 | 81 | 1.6 | 131 |

Table VI shows the effect of exposure on optical properties of Polyarylate I and Polycarbonate III.

Light transmission of polycarbonate was not affected by the exposure, while polyarylate showed slight change. Most significant was the comparison of haze development in the resins. The polycarbonate rapidly developed a very frosted surface, like etched glass, after less than 2,000 hours exposure, while the polyarylate showed only very light frosting and small increases in haze. This natural resistance to haze development is advantageous for economic production of outdoor weathering molded parts and sheeting without an additional protective coating.

TABLE VI

| EFFECT OF XW-WEATHEROMETER ON IMPACT EXPOSURE ON OPTICAL PROPERTIES | | | |
| --- | --- | --- | --- |
| Sample | Time (hrs) | Transmission (%) | Haze (%) |
| Polyarylate I | 0 | 65 | 6.1 |
| | 1,000 | 65 | 6.3 |
| | 2,000 | 63 | 13.0 |
| | 4,000 | 62 | 13.3 |
| | 8,000 | 58 | 15.0 |
| Polycarbonate III | 0 | 85 | 1.8 |
| | 1,000 | 83 | — |
| | 2,000 | 83 | 87.8 |
| | 4,000 | 86 | 70.1 |
| | 8,000 | 85 | 83.0 |

EXAMPLE

A Mylar, i.e., poly(ethylene terephthalate), film having a thickness of three mils was subjected to accelerated testing (carbon arc XW-Weatherometer exposure) as is, and with 2 mil and 5 mil polyarylate film placed on top of each specimen during exposure. The pendulum impact strength results are listed in Table VII after exposure intervals. The results clearly demonstrate the capability of thin polyarylate films to act as a UV protective coating.

TABLE VII

| POLYARYLATE FILM EVALUATION AS A UV PROTECTIVE COATING | | | |
| --- | --- | --- | --- |
| | Pendulum Impact Strength (ft-lb/in$^3$) | | |
| Mylar Substrate XW Exposure (hours) | Control Mylar | Mylar under 2-mil Polyarylate I | Mylar under 5-mil Polyarylate I |
| 0 | >1,888 | >1,880 | >1,880 |
| 500 | 10 | >1,790 | >1,823 |
| 1,000 | 0 | 1,906 | 1,652 |

What is claimed is:

1. A laminate comprising a layer of a polyarylate sheet, said polyarylate derived from a dihydric phenol and an aromatic dicarboxylic acid, and a layer of a sheet of a thermoplastic aromatic polycarbonate, a thermoplastic polyester derived from an aliphatic or cycloaliphatic diol, or mixtures thereof, and at least one aromatic dicarboxylic acid, or mixtures of the polycarbonate and polyester, the sheets which form the layers being from about 1 mil to about 100 mils thick for the polyarylate and from about 2 mils to ½-inch thick for the polycarbonate and/or polyester.

2. A laminate as defined in claim 1 which is from about 30 mils to about ½ inch thick.

3. A laminate as defined in claim 2 which is from about 40 mils to about 90 mils thick.

4. A laminate as defined in claim 1 wherein the dihydric phenol is of the following formula:

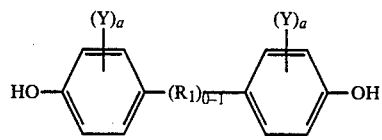

wherein Y is independently selected from, hydrogen, alkyl groups of 1 to 4 carbon atoms, chlorine or bromine, each a, independently, has a value of from 0 to 4, inclusive, and $R_1$ is a divalent saturated or unsaturated aliphatic hydrocarbon radical having from 1 to 6 carbon atoms, or a cycloalkylidene or cycloalkylene radicals having up to and including 9 carbon atoms, O, CO, $SO_2$, or S.

5. A laminate as defined in claim 1 wherein the aromatic dicarboxylic acid is selected from terephthalic acid, isophthalic acid, or mixtures thereof.

6. A laminate as defined in claim 1 wherein the dihydric phenol is bisphenol-A and the aromatic dicarboxylic acid is selected from terephthalic acid, isophthalic acid, or mixtures thereof.

7. A laminate as defined in claim 1 wherein the polyarylate is derived from a mixture of bisphenol-A and hydroquinone and a dicarboxylic acid selected from terephthalic acid, isophthalic acid, or mixtures thereof.

8. A laminate as defined in claim 1 wherein the polyarylate is a polyarylate carbonate.

9. A laminate as defined in claim 1 wherein the aromatic polycarbonate is derived from a dihydric phenol and a carbonate precursor.

10. A laminate as defined in claim 9 wherein the dihydric phenol is bisphenol-A.

11. A laminate as defined in claim 9 wherein the aromatic polycarbonate is derived from bisphenol-A and phosgene.

12. A laminate as defined in claim 9 wherein the polycarbonate is a polyester carbonate.

13. A laminate as defined in claim 1 wherein the polyester has repeating units of the formula:

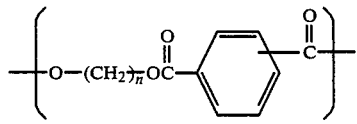

wherein n is an integer of from 2 to 10.

14. A laminate as defined in claim 1 wherein the polyester is poly(ethylene terephthalate).

15. A laminate as defined in claim 1 wherein the polyester has recurring units of the formula:

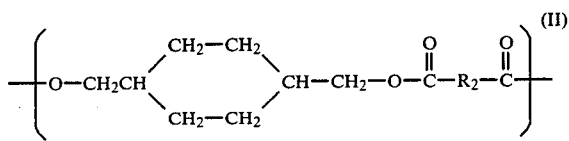

wherein the cyclohexane ring is selected from the cis- and trans-isomers thereof and $R_{17}$ represents an aryl radical containing 6 to 20 carbon atoms and which is the decarboxylated residue derived from an aromatic dicarboxylic acid.

16. A laminate as defined in claim 1 wherein the polyester has recurring units of the formula:

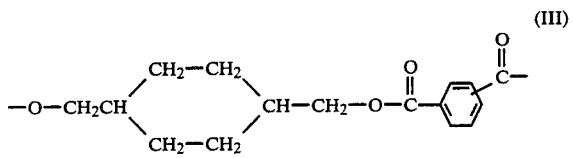

17. A laminate as defined in claim 1 wherein the polyarylate is blended with polycarbonate and/or a polyester.

18. A laminate as defined in claim 1 wherein the polyarylate is blended with a poly(ethylene terepthalate).

19. A laminate as defined in claim 1 wherein the polycarbonate and/or polyester is blended with a polyarylate.

20. A laminate comprising a sheet made from a layer of a polymer which undergoes Photo-Fries rearrangement and a sheet made from a layer of a thermoplastic aromatic polycarbonate, a thermoplastic polyester derived from an aliphatic or cycloaliphatic diol, or mixtures thereof, and at least one aromatic dicarboxylic acid, or mixtures of the polycarbonate and polyester.

21. A laminate as defined in claim 20 wherein the polymer which undergoes the Photo-Fries rearrangement is a polyarylate.

22. A shaped article made from the laminate of claim 1.

23. A shaped article as defined in claim 22 in the form of a lens.

24. A shaped article as defined in claim 22 in the form of a globe.

25. A laminate as defined in claim 1 coated with a mar resistance coating.

* * * * *